M. E. HOLDEN.
FLY TRAP.
APPLICATION FILED MAY 24, 1915.
1,194,736.
Patented Aug. 15, 1916.
2 SHEETS—SHEET 1.
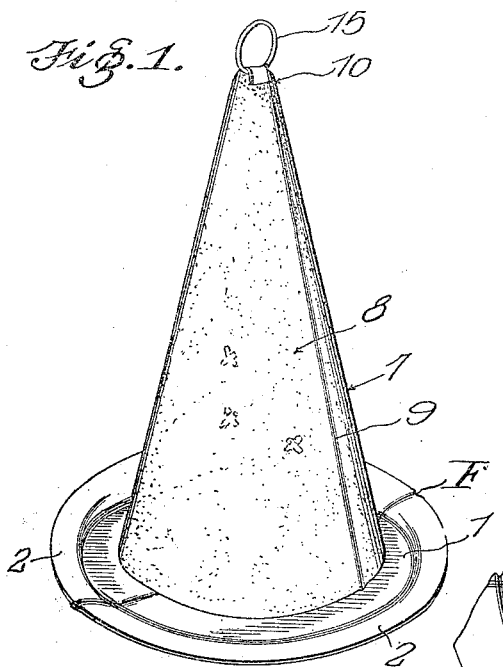
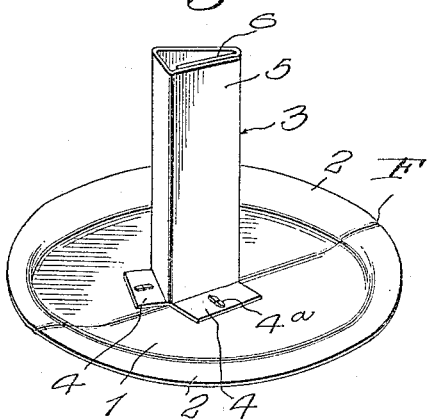
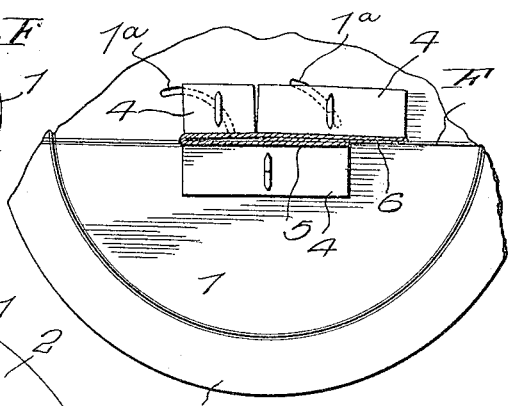
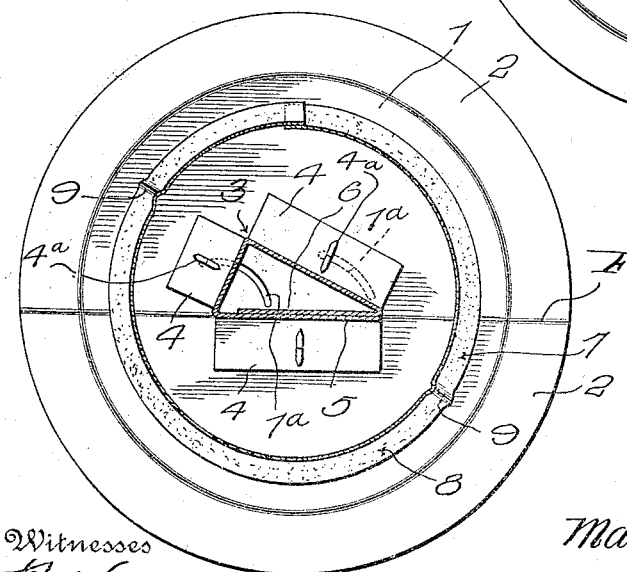
Inventor
Maria E. Holden
by H. R. Wilson &co.
Attorneys
Witnesses
H. Woodard M. E. HOLDEN.
FLY TRAP.
APPLICATION FILED MAY 24, 1915.
1,194,736.
Patented Aug. 15, 1916.
2 SHEETS—SHEET 2.
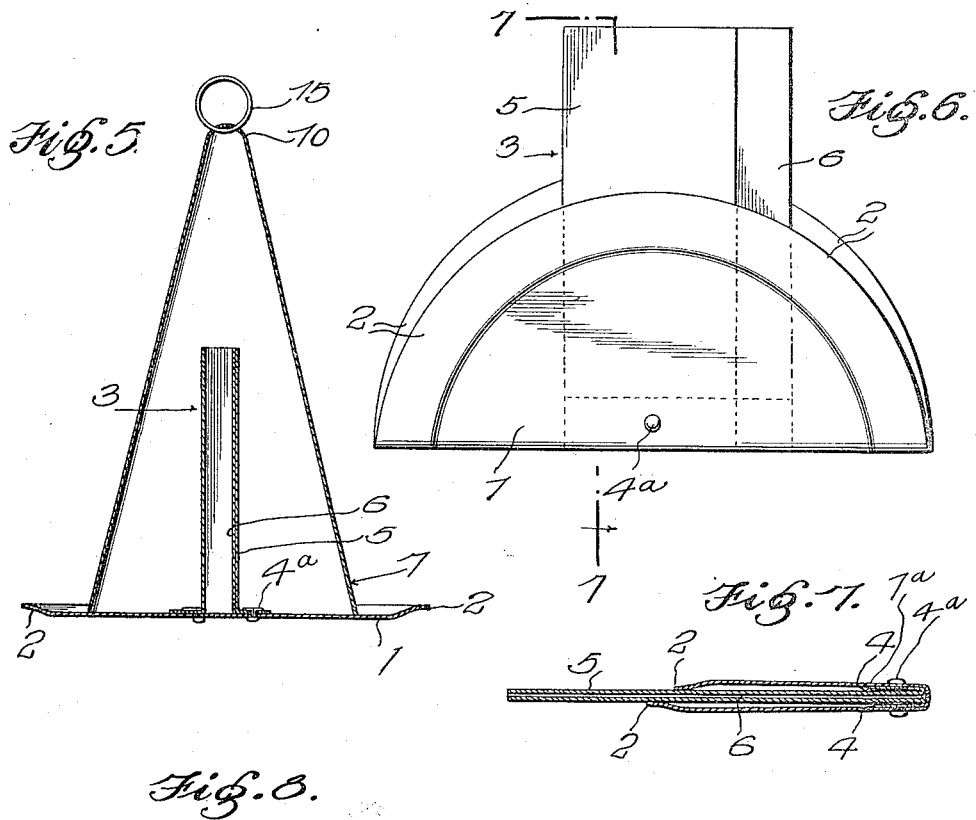
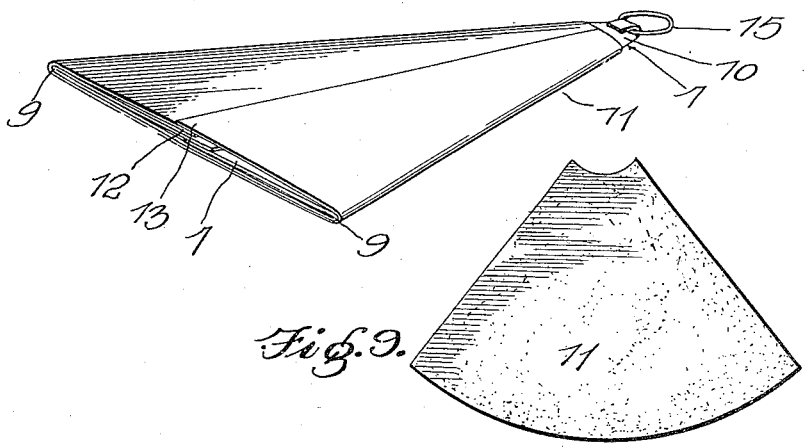
Witnesses
H. Woodard
Inventor
Maria E. Holden
by H. B. Willson & Co.
Attorneys

UNITED STATES PATENT OFFICE.

MARIA E. HOLDEN, OF YONKERS, NEW YORK.

FLY-TRAP.

1,194,736. Specification of Letters Patent. Patented Aug. 15, 1916.

Application filed May 24, 1915. Serial No. 30,084.

*To all whom it may concern:*

Be it known that I, MARIA E. HOLDEN, a citizen of the United States, residing at Yonkers, in the county of Westchester and State of New York, have invented certain new and useful Improvements in Fly-Traps; and I do declare the following to be a full, clear, and exact description of the invention, such as will enable others skilled in the art to which it appertains to make and use the same.

This invention relates to improvements in fly traps and more particularly to collapsible devices of this character.

The primary object of the invention is to provide a simply constructed, cheap and efficient device of this character which when collapsed lies flat and occupies small space and which is provided with means for protecting the sticky surface thereof to prevent the drying out of the adhesive and also to avoid surrounding objects from adhering thereto and becoming damaged.

With the foregoing and other objects in view, the invention consists of certain novel features of construction and the combination and arrangement of parts as will be more fully described and claimed.

In the accompanying drawings: Figure 1 represents a perspective view of this improved trap with the outer covering removed and with the trap disposed in upright operative position; Fig. 2 is a similar view with the cone removed; Fig. 3 is a horizontal section thereof looking down, showing the tube in open operative position; Fig. 4 is a similar view with parts broken out showing the tube folded; Fig. 5 is a vertical central section of the trap in operative position; Fig. 6 is a plan view showing the base and tube in folded collapsed position; Fig. 7 is a transverse section taken on the line 7—7 of Fig. 6; Fig. 8 is a perspective view of the trap with its cover applied collapsed ready for packing or storing; Fig. 9 is a plan view of the cover in open position.

In the embodiment illustrated a supporting base 1 is shown which may be circular or in any other desired shape and composed of any suitable self supporting material such as stiff paper or cardboard and which has an upstanding flange 2 arranged around the edge thereof, said base being here shown circular and adapted to be folded transversely on the line of the fold F. Secured centrally to this base is a tubular supporting member 3 here shown triangular in cross section although obviously it may be of any other desired cross sectional contour. This upright supporting member or column 3 is secured to the center of the base 1 in any suitable manner, it being here shown provided with laterally extending feet 4 through which pass fastening elements $4^a$ for securing it to the upper face of the base 1. One of the feet 4 is immovably secured to the base 1 at one side of the line of fold F (see Fig. 3), and the other two feet are movably connected therewith at the opposite side of the fold line F by the fasteners $4^a$ which pass through arcuate slots $1^a$ arranged to permit said fasteners to move therein during the folding or opening movement of the tube 3. (See Figs. 3 and 4.) This tubular member 3 is shown provided with overlapping edges 5 and 6 which are disconnected throughout the length of the tube to provide for its flat folding when in collapsed position, and when the tube is in operative upright position these edges or lips 5 and 6 are overlapped and secured together by any suitable means.

Designed to be mounted on its base and supported by the tubular member 3 is a collapsible hollow body 7 of any desired shape or configuration, such as a cone, prism or pyramid and which is composed of any self supporting material such as stiff paper, cardboard or similar material. This cone shaped member is provided on its exterior with an adhesive material 8 and is provided with lines of fold 9 passing through the vertex 10 of the cone so that in packing the devices for storage or transportation a plurality thereof may be superposed one on the other and thus occupy little space. To prevent these cone-shaped insect attracting members 7 from adhering together when so superposed, protective coverings 11 are provided which conform in shape to the members 7 being made slightly larger in size and having their edges 12 and 13 overlapping and preferably secured together by an adhesive which will permit the overlapping edges to be separated when sufficient force is exerted thereon so that when it is desired to uncover one of the members 4 the edges 12 and 13 of the cover are separated and then said cover is stripped off the member 7 and it may be spread out flat in the same manner that a sheet of tanglefoot is now used. The fly attracting member 7 is preferably provided at its vertex with a handle 15 for lifting the member 7 from place to place such as is necessary in assembling and disassembling the trap. This handle may be of any suitable or desired shape or material being preferably in the form of a wire loop secured to said vertex.

The device is assembled as follows: The supporting base 1 is first opened into flat position and the tubular column 3 straightened up into upright position thereon and the overlapping edges 5 and 6 secured together by any suitable means, the connection of these ends tending to hold said column in operative upright position. The cone-shaped fly attracting member is then passed over the column 3 with its lower edge resting on the base plate 1 within the flange 2 thereof, said column 3 serving to prevent lateral displacement of the member 7. After this member 7 with its protective casing or hood 11 has been so disposed the hood is removed from the member 7 by separating the edges 12 and 13 thereof and disconnecting the hood from the sticky face of the member 7 and the device is then ready for use, the hood being employed separately in the same manner that a sheet of tanglefoot may be used or in any other desired manner. The base member 1 serves as a guard for preventing accidental contact of any article with the fly paper and also serves as means for receiving any drip of liquid material running down from the cone and this drip may be used for connecting the edge of said cone-shaped member with the base plate serving as a cement for this purpose.

While this device is described and shown with the members when in collapsed position arranged in separate stacks, it is obvious that if desired the plate or base 1 may be folded with the cone-shaped member 7 and its incasing hood 11 arranged in position on the support 3 so that each individual trap will be complete in itself either when in folded knocked down position or when set up ready for use, and consequently they may if desired be placed in separate packages or disposed one on the other and sold in groups as may be desired.

From the foregoing description it will be obvious that when the device is constructed as set forth the several members may be readily disconnected and stored in flat or knocked down position and conveniently assembled for use, being cheap to manufacture and effective in use.

I claim as my invention:

1. A fly trap comprising a foldable base, a collapsible tubular member foldably secured at one end to said base plate, and a cone shaped insect attracting member disposed over said tubular member with its lower edge resting on said base plate, said cone shaped member being held against lateral displacement by said tubular member.

2. A fly trap comprising a foldable base having an upright flange, a tubular column provided at one end with laterally extending feet secured to said base plate, said column being foldable at the junction thereof with its feet and being slit longitudinally throughout its length to provide for the flat folding of the side walls thereof when in collapsed position, means for connecting the edges of said slit portion in overlapping relation when the column is in upright position, and a hollow fly attracting member arranged over said column on said base plate and held against lateral displacement by said column.

3. A fly trap comprising a foldable base having an upright flange, a tubular column provided at one end with laterally extending feet secured to said base plate, said column being foldable at the junction thereof with its feet and being slit longitudinally throughout its length to provide for the flat folding of the side walls thereof when in collapsed position, means for connecting the edges of said slit portion in overlapped relation when the column is in upright position, a hollow cone shaped member mounted on said base plate over said column provided with an adhesive material on its outer face, and a handle secured to the vertex of said cone shaped member.

4. A fly trap comprising a foldable base having an upright flange, a tubular column provided at one end with laterally extending feet secured to said base plate, said column being foldable at the junction thereof with its feet and being slit longitudinally throughout its length to provide for the flat folding of the side walls thereof when in collapsed position, means for connecting the edges of said slit portion in overlapping relation when the column is in upright position, a hollow cone shaped member mounted on said base plate over said column provided with an adhesive material on its outer face, and a handle secured to the vertex of said cone-shaped member.

5. A fly trap comprising a supporting base, a longitudinally foldable tubular member having a plurality of laterally extending feet, one of which is fixedly secured to said base and the others movably connected therewith, and an insect carrying member supported by said tubular member.

6. A fly trap comprising a supporting base, a longitudinally foldable tubular member having a plurality of laterally extending feet, one of which is fixedly secured to said base and the others movably connected therewith, said base having arcuate slots therein, and fastening elements carried by said movable feet and slidably engaged with said slots.

7. A fly trap comprising a base, a tubular column secured to said base and foldable at the junction thereof with said base, said column being slit longitudinally throughout its length to provide for the flat folding of the side walls thereof when in collapsed position, means for connecting the edges of said slit portion in overlapping relation when the column is in upright position, and a hollow fly attracting member arranged over said column on said base and held against lateral displacement by said column.

In testimony whereof I have hereunto set my hand in presence of two subscribing witnesses.

MARIA E. HOLDEN.

Witnesses:
S. HARRISON NORTON,
ALBERT W. JONES.

Copies of this patent may be obtained for five cents each, by addressing the "Commissioner of Patents, Washington, D. C."